United States Patent

Hebbale et al.

[11] Patent Number: 6,165,098
[45] Date of Patent: Dec. 26, 2000

[54] POWERTRAIN WITH A SIX SPEED TRANSMISSION

[75] Inventors: Kumaraswamy V. Hebbale; Sekhar Raghavan; Patrick Benedict Usoro, all of Troy, Mich.

[73] Assignee: General Motors Corporation, Detroit, Mich.

[21] Appl. No.: 09/442,309

[22] Filed: Nov. 22, 1999

[51] Int. Cl.[7] .................................................... F16H 3/66
[52] U.S. Cl. ............................ 475/284; 475/325; 475/326
[58] Field of Search ................................... 475/280, 284, 475/325, 326

[56] References Cited

U.S. PATENT DOCUMENTS

| | | | |
|---|---|---|---|
| 2,873,623 | 2/1959 | Simpson | 475/280 |
| 3,946,623 | 3/1976 | Murakami et al. | 475/280 |
| 5,194,055 | 3/1993 | Oshidari | 475/280 |
| 5,830,102 | 11/1998 | Coffey | 475/285 |
| 5,853,345 | 12/1998 | Park | 475/284 |

*Primary Examiner*—Sherry Estremsky
*Attorney, Agent, or Firm*—George A. Grove

[57] ABSTRACT

A powertrain has an engine, torque converter and multi-speed transmission. The transmission has a simple planetary gear set and a compound planetary gear set. The gear sets are interconnected between the sun gear member of the simple planetary and the carrier assembly member of the compound planetary. The simple planetary ring gear member is continuously connected with an output shaft and the sun gear member of the compound planetary is continuously connected with an input shaft. Four clutches and two brakes are selectively engaged in pairs to provide six forward speed ratios and one reverse ratio.

4 Claims, 1 Drawing Sheet

| GEAR | RATIO | 28 | 30 | 32 | 34 | 36 | 38 |
|---|---|---|---|---|---|---|---|
| REV | -2.63 | | | X | | | X |
| 1st | 4.56 | | X | | | | X |
| 2nd | 2.58 | X | | | | | X |
| 3rd | 1.98 | | X | | | X | |
| 4th | 1.43 | X | | | | X | |
| 5th | 1.00 | X | | | X | | |
| 6th | 0.72 | | | | | X | X |

X = ENGAGED

POWERTRAIN WITH A SIX SPEED TRANSMISSION

TECHNICAL FIELD

This invention relates to powertrains having multi-speed transmission and more particularly to multi-speed planetary transmissions.

BACKGROUND OF THE INVENTION

In an effort to improve the overall performance of a vehicle while also reducing the mass of the vehicle, the number of speed ratios available through the transmission is increased. This permits a more efficient use of the engine operating range while also reducing the size of the engine. The increased number of speed ratios allows for a higher low gear ratio which will result in a reduced size torque converter.

The number of forward speed ratios in power transmissions has increased from two to five over a number of years. Many of the five speed transmissions incorporate two or three interconnected simple or compound planetary gear sets and five or six selectively engageable clutches or brakes. These transmissions quite often include one or more bridging clutches when two interconnected planetary gear sets are utilized. One example of this type of power transmission can be seen in U.S. Pat. No. 5,830,102 issued to Coffey on Nov. 3, 1998.

Currently, many manufacturers are considering increasing the number of ratios to six or seven. These transmissions generally contain three planetary gear sets. One such transmission is seen in U.S. Pat. No. 3,946,623 issued Mar. 30, 1976. This prior art transmission incorporates four interconnected planetary gear sets, three clutches and four brakes when more than five speed ratios are to be attained.

A six speed planetary having two simple planetary gear sets is disclosed in U.S. Ser. No. 09/383,429 filed Aug. 27, 1999 and assigned to the assignee of this application. Other six speed planetary transmissions having a simple planetary gear set and a compound planetary gear set are disclosed in co-pending U.S. Ser. Nos. 09/442,310, 09/442,308 and 09/492,307 all filed Nov. 22, 1999.

SUMMARY OF THE INVENTION

It is an object of the present invention to provide an improved power transmission having six forward speeds and one reverse speed.

In one aspect of the present invention, two planetary gear sets are selectively interconnected to provide six forward speed ratios and one reverse ratio. In another aspect of the present invention, one of the planetary gear sets is a simple planetary gear set and the other is a compound gear set. In yet another aspect of the present invention, a member of one of the planetary gear sets is continuously connected with an input shaft and one member of the other planetary gear set is continuously connected with an output shaft.

In still another aspect of the present invention, the planetary gear sets are controlled by four clutches and two brakes. In a further aspect of the present invention, one of the clutches establishes an input power path to one member of the simple planetary gear set. In yet a further aspect of the present invention, three of the forward speed ratios (first, second and fourth) are established using both of the planetary gear sets. In still a further aspect of the present invention, the highest (sixth) forward speed ratio and the reverse ratio are established using the simple planetary gear set, and one of the forward ratios (third) is established using only the compound planetary gear set. In yet still a further aspect of the present invention, the planetary gear sets are controlled by the clutches and brakes to provide four underdrive ratios, a direct ratio and an overdrive ratio in the forward direction.

DESCRIPTION OF AN EXEMPLARY EMBODIMENT

Figures 1, 2:
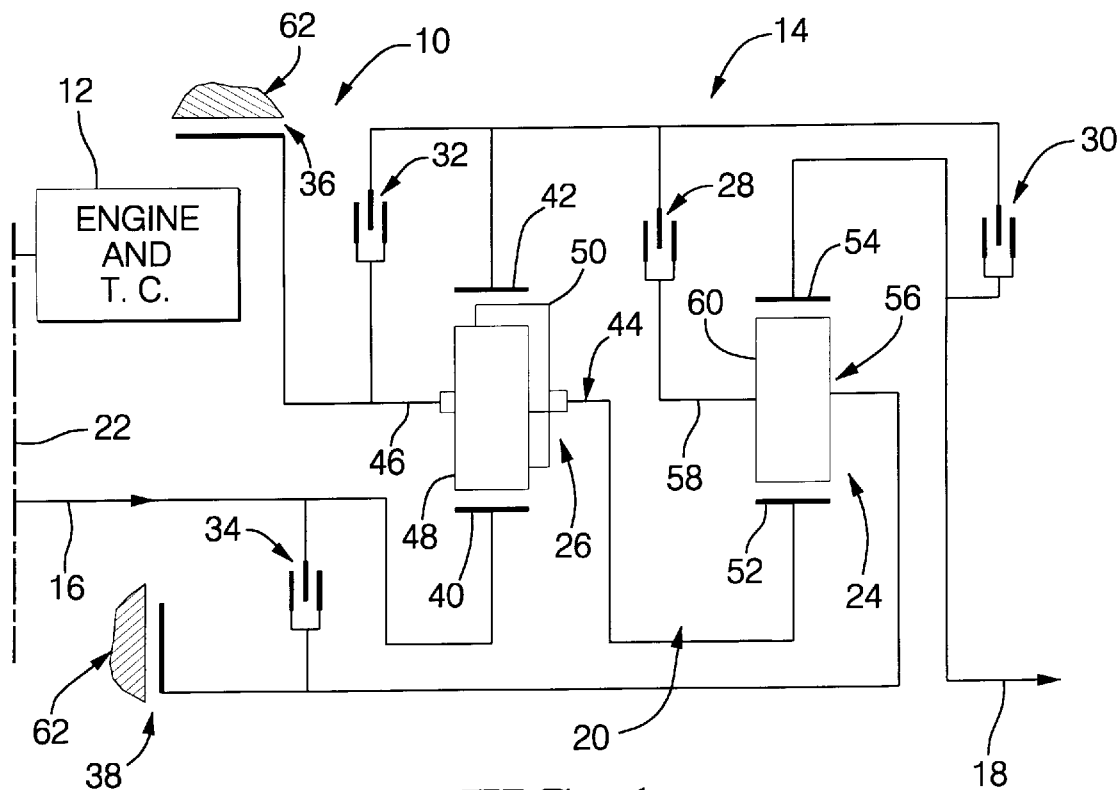
FIG. 1 is a schematic representation of a powertrain incorporating the present invention.
FIG. 2 is a table listing the ratios and the state of engagement of the torque transmitting mechanisms.

A powertrain 10 has an engine and torque converter 12 and a power transmission 14. The engine and torque converter 12 are conventional devices well known in the art. The power transmission 14 has an input shaft 16, an output shaft 18 and a planetary gear arrangement 20. The input shaft 16 is driven by the engine and torque converter 12 through a conventional drive mechanism such as a chain drive 22.

The planetary gear arrangement 20 includes a simple planetary gear set 24, a compound planetary gear set 26, six selectively engageable fluid-operated friction torque transmitting mechanisms including four clutches 28, 30, 32 and 34 and two brakes 36 and 38. The compound planetary gear set 26 includes a sun gear member 40, a ring gear member 42 and a planetary carrier assembly 44 that includes a cage 46 with a plurality of meshing pinion gear members 48 and 50. The pinion gear members 48 also mesh with the sun gear member 40 and the pinion gear members 50 also mesh with the ring gear member 42.

The simple planetary gear set 24 includes a sun gear member 52, a ring gear member 54 and a planetary carrier assembly member 56. The planetary carrier member 56 includes a cage 58 on which a plurality of pinion gear members 60 are rotatably mounted and disposed in mesh with both the sun gear member 52 and the ring gear member 54.

The sun gear member 40 is continuously drivingly connected with the input shaft 16. The ring gear 54 is continuously drivingly connected with the output shaft 18. The carrier assembly member 44 and the sun gear member 52 are continuously interconnected together and selectively connectable with a stationary component, such as a transmission housing, 62 through the brake 36 and with the ring gear member 42 through the clutch 32. The carrier assembly member 56 is selectively connectable with the input shaft 16 through the clutch 34, with the ring gear member 42 through the clutch 28, and the housing 62 through the brake 38. The ring gear member 42 is selectively connectable with the output shaft 18 through the clutch 30.

The carrier assembly member 56 can be either an input member or a reaction member in the planetary gear arrangement 20 with the selective engagement of the clutch 34 or brake 38, respectively. With the simultaneous engagement of the brake 38 and the clutch 28, the ring gear member 42 will be a reaction member in the planetary gear arrangement 20. The engagement of the brake 36 will cause both the sun gear member 52 and the carrier assembly member 44 to be established as reaction members in the planetary gear arrangement 20. The engagement of the clutch 30 establishes the ring gear member 42 as an output member in the planetary gear arrangement 20. The compound planetary gear set 26 is conditioned for a direct drive when the clutch 32 is engaged to interconnect the planetary carrier assembly member 44 and the ring gear member 42.

FIG. 2 is a table that depicts the engagement condition of the clutches and brakes in the planetary gear arrangement 20 during the establishment of six forward ratios and one reverse ratio. An "X" indicates that the particular friction device is engaged. A neutral condition is established when no friction devices are engaged or when only the brake 38 is engaged. The ratios given in the table are determined from the ring gear to sun gear tooth ratios in the planetary gear sets 24 and 26. The tooth ratio of the ring gear member 42 divided by the sun gear member 40 is 1.98; the tooth ratio of the ring gear member 54 divided by the sun gear member 52 is 2.63.

To establish the reverse speed ratio, the clutch 32 and the brake 38 are engaged. This establishes the carrier assembly member 56 as a reaction device and places the planetary gear set 26 in a direct drive ratio. The sun gear member 40 is an input member. Since the planetary gear set is in a direct drive condition, the sun gear 52 is driven at engine speed and the ring gear 54 is driven in the opposite direction at a reduced speed as indicated by the table in FIG. 2. The speed ratio in reverse, as determined by the planetary gear set 24, is equal to the number of teeth on the ring gear member 54 divided by the number of teeth on the sun gear member 52.

The first forward ratio is established by the engagement of the brake 38 and the clutch 30. The sun gear member 40 is an input member and the carrier assembly member 56 is a reaction member. The ring gear members 42 and 54 are interconnected and are the output members. The speed ratio is determined by both planetary gear sets 24 and 26. It will be appreciated by those skilled in the art that the brake 38 can remain engaged through the neutral condition and the forward/reverse interchange can be made by swapping the clutches 30 and 32. The first forward speed ratio is an underdrive.

The second forward ratio is established by the engagement of the brake 38 and the clutch 28. This conditions both the carrier assembly member 56 and the ring gear member 42 as reaction members in the planetary gear arrangement 20. The sun gear member 40 is the input member and the ring gear member 54 is the output member. The first/second ratio interchange is a single transition shift. The second forward ratio is determined by both of the planetary gear sets 24 and 26. The second forward speed ratio is an underdrive.

The third forward speed ratio is established by the engagement of the brake 36 and the clutch 30. This conditions the carrier assembly member 44 as a reaction member and the ring gear member 42 as the output member. The sun gear member 40 is the input member. The third forward speed ratio is determined by the compound planetary gear set only. The second/third ratio interchange is a double transition shift. The third forward speed ratio is an underdrive.

The fourth forward ratio is established by the engagement of the clutch 28 and the brake 36. The third/fourth ratio interchange is a single transition shift. The carrier assembly member 44 and the sun gear member 52 are reaction members in the planetary gear arrangement 20 while the sun gear member 40 is an input member. Both of the planetary gear sets 24 and 26 contribute to the fourth forward speed ratio which is an underdrive ratio.

The fifth forward speed ratio is established by the engagement of the clutch 28 and the clutch 34. The fourth/fifth ratio interchange is a single transition shift. The engagement of the clutch 28 connects the carrier assembly member 56 with the ring gear member 42. The engagement of the clutch 34 connects both the carrier assembly member 56 and the ring gear member 42 with the input shaft 16. Since both the sun gear member 40 and the ring gear member 42 are rotated at the speed of the input shaft 16, the entire compound planetary gear set 26 will rotate at the speed of the input shaft 16. The carrier assembly member 44 and the sun gear member 52 will therefore be rotated in unison such that the simple planetary gear set 24 and the output shaft 18 will also rotate at the speed of the input shaft 16. The fifth forward speed ratio is a direct drive. Other clutch combinations are possible to establish a direct drive; however, the clutch combination selected is believed to be the most beneficial.

The sixth forward speed ratio is established with the engagement of the clutch 34 and the brake 36. The fifth/sixth ratio interchange is a single transition shift. The brake 36 establishes the sun gear member 52 as a reaction member in the planetary gear set 24, and the clutch 34 establishes the carrier assembly member 56 as an input member. This creates an overdrive ratio between the input shaft 16 and the output shaft 18 that is dependant solely on the simple planetary gear set 24.

Those skilled in the art will recognize that the clutches 28, 30 and 32 are interconnecting clutches. The clutch 28 interconnects the carrier assembly member 56 with the ring gear member 42, the clutch 30 connects the ring gear member 42 with the output shaft 18, and the clutch 32 interconnects the carrier assembly member 44 and the ring gear member 42. Each of the clutches effects a connection between the ring gear member 42 and another component of the planetary transmission 14. The clutch 34 is an input clutch that is effective to connect the carrier assembly member 56 with the input shaft 16 and, therefore, the engine and torque converter 12.

What is claimed is:

1. A power transmission comprising:
   an input shaft;
   an output shaft;
   a simple planetary gear set having a first sun gear member, a first ring gear member, and a first carrier assembly member, said ring gear member being continually connected for common rotation with said output shaft;
   a compound planetary gear set having a second sun gear member, a second ring gear member, and a second carrier assembly member, said second sun gear member being connected for common rotation with said input shaft, said second carrier assembly member being connected for common rotation with said first sun gear member;
   a first torque transmitting mechanism selectively connecting said second ring gear member with said first carrier assembly member;
   a second torque transmitting mechanism selectively connecting said second ring gear member with said output shaft;
   a third torque transmitting mechanism selectively and individually connecting said second carrier assembly member with said second ring gear member, said first torque transmitting mechanism, and said second torque transmitting mechanism;
   a fourth torque transmitting mechanism selectively connecting said first carrier assembly member with said input shaft;
   a fifth torque transmitting mechanism selectively connecting said first sun gear member and said second carrier assembly member with a stationary component of the transmission; and a sixth torque transmitting mechanism selectively connecting said first carrier assembly member with said stationary component.

2. The power transmission defined in claim 1 further wherein said torque transmitting mechanisms being selectively operated in combinations of two to provide six forward speed ratios and one reverse ratio.

3. The power transmission defined in claim 1 further wherein said first torque transmitting mechanism and said fourth torque transmitting mechanism are selectively operated to connect said second ring gear member with said input shaft.

4. A power transmission comprising:

an input shaft;

an output shaft;

a simple planetary gear set having first, second, and third rotatable members;

a compound planetary gear set having fourth, fifth, and sixth rotatable members;

said first rotatable member and said fifth rotatable member being continually connected;

said third rotatable member being continually connected with said output shaft;

said fourth rotatable member being continually connected with said input shaft;

first, second and third selectively operable torque transmitting mechanisms for individually connecting said sixth member with said second rotatable member, said output shaft, and said fifth rotatable member, respectively;

a fourth selectively operable torque transmitting mechanism for connecting said second member with said input shaft; and fifth and sixth selectively operable torque transmitting members for selectively restraining rotation of said second rotatable member and said fifth rotatable member, respectively.

* * * * *